United States Patent
Mouri et al.

(10) Patent No.: US 12,434,624 B2
(45) Date of Patent: Oct. 7, 2025

(54) VEHICLE LIGHTING DEVICE FOR LANE CHANGE INDICATION AND VEHICLE LIGHTING DEVICE WITH IMAGE PROJECTION ON ROAD SURFACE

(71) Applicant: TOYOTA JIDOSHA KABUSHIKI KAISHA, Aichi-ken (JP)

(72) Inventors: Fumihiko Mouri, Owariasahi (JP); Kento Nakazato, Tama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 28 days.

(21) Appl. No.: 18/433,406

(22) Filed: Feb. 6, 2024

(65) Prior Publication Data
US 2024/0278716 A1   Aug. 22, 2024

(30) Foreign Application Priority Data
Feb. 17, 2023   (JP) .................................. 2023-023540

(51) Int. Cl.
B60Q 1/50   (2006.01)

(52) U.S. Cl.
CPC ........ B60Q 1/547 (2022.05); *B60Q 2300/338* (2013.01); *B60Q 2300/43* (2013.01); *B60Q 2400/50* (2013.01)

(58) Field of Classification Search
CPC .............. B60Q 1/547; B60Q 2300/338; B60Q 2300/43
See application file for complete search history.

(56) References Cited

U.S. PATENT DOCUMENTS

| | | | | |
|---|---|---|---|---|
| 9,896,107 B1* | 2/2018 | Huang | ................. | B60W 50/14 |
| 10,053,001 B1* | 8/2018 | Nabbe | .................... | B60Q 1/543 |
| 10,134,280 B1* | 11/2018 | You | ........................ | B60Q 1/525 |
| 10,227,072 B2* | 3/2019 | Kubota | ................. | B60W 30/09 |
| 10,311,718 B2* | 6/2019 | Suzuki | .................. | B60Q 1/547 |
| 10,741,083 B2* | 8/2020 | Masuda | ................... | B60Q 1/26 |
| 10,829,036 B2* | 11/2020 | Sugiyama | ............... | F21S 43/14 |
| 12,109,937 B2* | 10/2024 | Mouri | .................... | B60Q 1/547 |
| 2004/0036586 A1* | 2/2004 | Harooni | ................ | G01S 17/931 |
| | | | | 180/167 |

(Continued)

FOREIGN PATENT DOCUMENTS

| | | |
|---|---|---|
| CN | 108688556 A | 10/2018 |
| JP | 2021-079907 A | 5/2021 |

(Continued)

*Primary Examiner* — Hoi C Lau
(74) *Attorney, Agent, or Firm* — HAUPTMAN HAM, LLP

(57) ABSTRACT

A vehicle lighting device disclosed in this specification comprises an illumination unit that draws an image on a road surface around a vehicle by illuminating the road surface with light; a turn signal unit that causes a turn signal lamp to flash; and a controller configured to control the illumination unit, wherein when the vehicle changes a lane from a first lane to a second lane adjacent to the first lane, the controller causes the turn signal lamp to flash on a lane change side, and causes the illumination unit to draw a lane change image for notifying surroundings of a behavior of the vehicle, and the controller changes a configuration of the lane change image according to at least one of a presence and a position of a subsequent vehicle traveling rearward of the vehicle and along the second lane.

4 Claims, 5 Drawing Sheets

(56) References Cited

U.S. PATENT DOCUMENTS

| | | | |
|---|---|---|---|
| 2005/0117364 A1* | 6/2005 | Rennick | B60Q 9/008 |
| | | | 362/540 |
| 2010/0121561 A1* | 5/2010 | Kodaira | G06V 20/588 |
| | | | 382/104 |
| 2012/0044090 A1* | 2/2012 | Kahler | B60Q 1/245 |
| | | | 340/905 |
| 2017/0349172 A1* | 12/2017 | Kubota | B60W 30/09 |
| 2018/0004020 A1* | 1/2018 | Kunii | G03B 21/12 |
| 2018/0072220 A1* | 3/2018 | Yan | G08G 1/162 |
| 2018/0261081 A1* | 9/2018 | Suzuki | B60Q 1/525 |
| 2018/0297470 A1* | 10/2018 | Kim | B60Q 1/085 |
| 2018/0334089 A1* | 11/2018 | Huang | B60Q 5/006 |
| 2019/0279507 A1* | 9/2019 | Ishisaka | G08G 1/16 |
| 2020/0070716 A1* | 3/2020 | Sakata | B60Q 1/50 |
| 2020/0189454 A1* | 6/2020 | Boilevin | B60Q 1/543 |
| 2020/0346704 A1* | 11/2020 | Mochizuki | B60Q 9/008 |
| 2021/0009135 A1* | 1/2021 | Taniguchi | B60K 35/22 |
| 2021/0046864 A1* | 2/2021 | Elgrably | B60Q 1/324 |
| 2021/0101600 A1* | 4/2021 | Kato | B60Q 1/40 |
| 2021/0188160 A1* | 6/2021 | Jung | B60Q 1/46 |
| 2022/0041160 A1* | 2/2022 | Jung | B60K 35/28 |
| 2023/0107328 A1* | 4/2023 | Mouri | B60Q 1/442 |
| | | | 340/468 |
| 2023/0158947 A1* | 5/2023 | Mouri | B60Q 1/547 |
| | | | 340/468 |
| 2023/0166652 A1* | 6/2023 | Mouri | B60Q 1/34 |
| | | | 340/468 |
| 2023/0173976 A1* | 6/2023 | Mouri | G09G 3/001 |
| 2023/0191988 A1* | 6/2023 | Rodriguez | B60Q 1/535 |
| | | | 340/468 |
| 2023/0331144 A1* | 10/2023 | Mouri | B60Q 1/22 |
| 2023/0356653 A1* | 11/2023 | Nagata | G06F 3/013 |
| 2024/0278716 A1* | 8/2024 | Mouri | B60Q 1/381 |
| 2025/0046192 A1* | 2/2025 | Münning | B60W 30/18163 |
| 2025/0100442 A1* | 3/2025 | Masuda | B60R 1/24 |

FOREIGN PATENT DOCUMENTS

| | | |
|---|---|---|
| WO | 2019159220 A1 | 8/2019 |
| WO | 2022070820 A1 | 4/2022 |

\* cited by examiner

| Pvf | | DANGER ZONE | CAUTION ZONE | SAFETY ZONE | NO SUBSEQUENT VEHICLE |
|---|---|---|---|---|---|
| FRONT-SIDE IMAGE | SIZE | LARGE | MIDDLE | STANDARD | STANDARD |
| | CYCLE OF BLINKING | SHORT | SHORT | STANDARD | STANDARD |
| REAR-SIDE IMAGE | SIZE | NOT DRAWN | MIDDLE | STANDARD | STANDARD |
| | CYCLE OF BLINKING | | SHORT | STANDARD | STANDARD |

FIG. 4

| Pvf* | DANGER ZONE | | | CAUTION ZONE | | | SAFETY ZONE | | | NO SUBSEQUENT VEHICLE |
|---|---|---|---|---|---|---|---|---|---|---|
| Pvf | DANGER ZONE | CAUTION ZONE | SAFETY ZONE | DANGER ZONE | CAUTION ZONE | SAFETY ZONE | DANGER ZONE | CAUTION ZONE | SAFETY ZONE | |
| FRONT-SIDE IMAGE — SIZE | LARGE | LARGE | LARGE | MIDDLE | MIDDLE | LARGE | STANDARD | STANDARD | STANDARD | STANDARD |
| FRONT-SIDE IMAGE — CYCLE OF BLINKING | SHORT | SHORT | SHORT | SHORT | SHORT | SHORT | STANDARD | STANDARD | STANDARD | STANDARD |
| REAR-SIDE IMAGE — SIZE | NOT DRAWN | NOT DRAWN | NOT DRAWN | MIDDLE | MIDDLE | SHORT | STANDARD | STANDARD | STANDARD | STANDARD |
| REAR-SIDE IMAGE — CYCLE OF BLINKING | NOT DRAWN | NOT DRAWN | NOT DRAWN | SHORT | SHORT | SHORT | STANDARD | STANDARD | STANDARD | STANDARD |

FIG. 5

VEHICLE LIGHTING DEVICE FOR LANE CHANGE INDICATION AND VEHICLE LIGHTING DEVICE WITH IMAGE PROJECTION ON ROAD SURFACE

CROSS REFERENCE TO RELATED APPLICATION

This application claims priority to Japanese Patent Application No. 2023-23540 filed on Feb. 17, 2023, which is incorporated herein by reference in its entirety including the specification, claims, drawings, and abstract.

TECHNICAL FIELD

This specification discloses a vehicle lighting device capable of drawing an image on a road surface around a vehicle.

BACKGROUND

Conventionally, a vehicle lighting device capable of drawing an image on a road surface around a vehicle has been proposed. For example, Patent Document 1 discloses a vehicle driving support system that projects a course display image indicating a course of a vehicle onto a road surface. In Patent Document 1, when another vehicle does not exist within a predetermined distance in front of the vehicle, a course display image is projected in front of the vehicle, and when another vehicle exists, a course display image is not projected in front of the vehicle. Similarly, when another vehicle exists within a predetermined distance behind the vehicle, no course display image is projected to the rear of the vehicle.

However, Patent Document 1 only considers the presence of other vehicles immediately forward or immediately rearward of the vehicle. In other words, in Patent Document 1, when the vehicle changes the lane from the first lane to the second lane, no consideration is given to the subsequent vehicle traveling on the second lane. Therefore, there is room for improvement in the technology of Patent Document 1 in order to make the lane change more smoothly.

Accordingly, this specification discloses a vehicle lighting device that supports smoother lane change.

CITATION LIST

PATENT DOCUMENT 1: JP. 2021-79907 A

SUMMARY

A vehicle lighting device disclosed in this specification comprises an illumination unit that draws an image on a road surface around a vehicle by illuminating the road surface with light; a turn signal unit that causes a turn signal lamp to flash; and a controller configured to control the illumination unit, wherein when the vehicle changes a lane from a first lane to a second lane adjacent to the first lane, the controller causes the turn signal lamp to flash on a lane change side, and causes the illumination unit to draw a lane change image for notifying surroundings of a behavior of the vehicle, and the controller changes a configuration of the lane change image according to at least one of a presence and a position of a subsequent vehicle traveling rearward of the vehicle and along the second lane.

With such a configuration, the driver of the vehicle can easily notice the presence of the subsequent vehicle when changing the lane. Further, the driver of the subsequent vehicle can easily recognize the start of the lane change of the vehicle. As a result, a smoother lane change is supported by the vehicle lighting device.

In this case, the controller may cause the lane change image to be drawn in a standard size and causes the lane change image to brink in a same cycle as the turn signal lamp when the subsequent vehicle does not exist, and may cause the lane change image to be drawn in a size larger than the standard size and causes the lane change image to brink in a cycle shorter than the turn signal lamp when the subsequent vehicle exists.

This configuration makes it easier for the driver of the vehicle to notice the presence of the subsequent vehicle, and makes it easier for the driver of the subsequent vehicle to recognize the start of the lane change. As a result, a smoother lane change is supported by the vehicle lighting device.

The controller may stepwise shorten the cycle of blinking of the lane change image and may stepwise increase the size of the lane change image as the distance between the vehicle and the subsequent vehicle becomes closer.

With this configuration, an image corresponding to the risk of lane change is drawn. As a result, a smoother lane change is supported by the vehicle lighting device.

The controller may estimate a position of the subsequent vehicle at the time of completion of the lane change, and may stepwise shorten a cycle of blinking of the lane change image and may stepwise increases a size of the lane change image as a distance between the vehicle and the estimated position becomes closer.

With this configuration, an image corresponding to the risk of lane change is drawn. As a result, a smoother lane change is supported by the vehicle lighting device.

The lane change image may include a front-side image illuminated at a position where a driver of the vehicle can visually recognize directly, and a rear-side image illuminated at a side of a rear portion of the vehicle, and when the subsequent vehicle may be positioned in an illumination area of the rear-side image, the controller may stop the drawing of the rear-side image while causing the front-side image to be drawn in a configuration different from the configuration in which the subsequent vehicle is not positioned in the illumination area of the rear-side image.

With such a configuration, the driver of the vehicle can easily observe the front-side image. The driver of the vehicle can clearly recognize the presence or absence of the subsequent vehicle by observing the front-side image. As a result, a smoother lane change is supported by the vehicle lighting device. Further, when the subsequent vehicle is positioned in the irradiation area of the rear-side image, the drawing of the rear-side image is stopped, thereby reducing discomfort to the driver of the subsequent vehicle.

This vehicle lighting device disclosed in this specification enables smoother lane change.

BRIEF DESCRIPTION OF DRAWINGS

Embodiment(s) of the present disclosure will be described based on the following figures, wherein:

FIG. 4 is a table showing an example of a change in the form of a lane change image; and FIG. 5 is a table showing another modification of the mode of the lane change image.

DESCRIPTION OF EMBODIMENT

Figure 1:
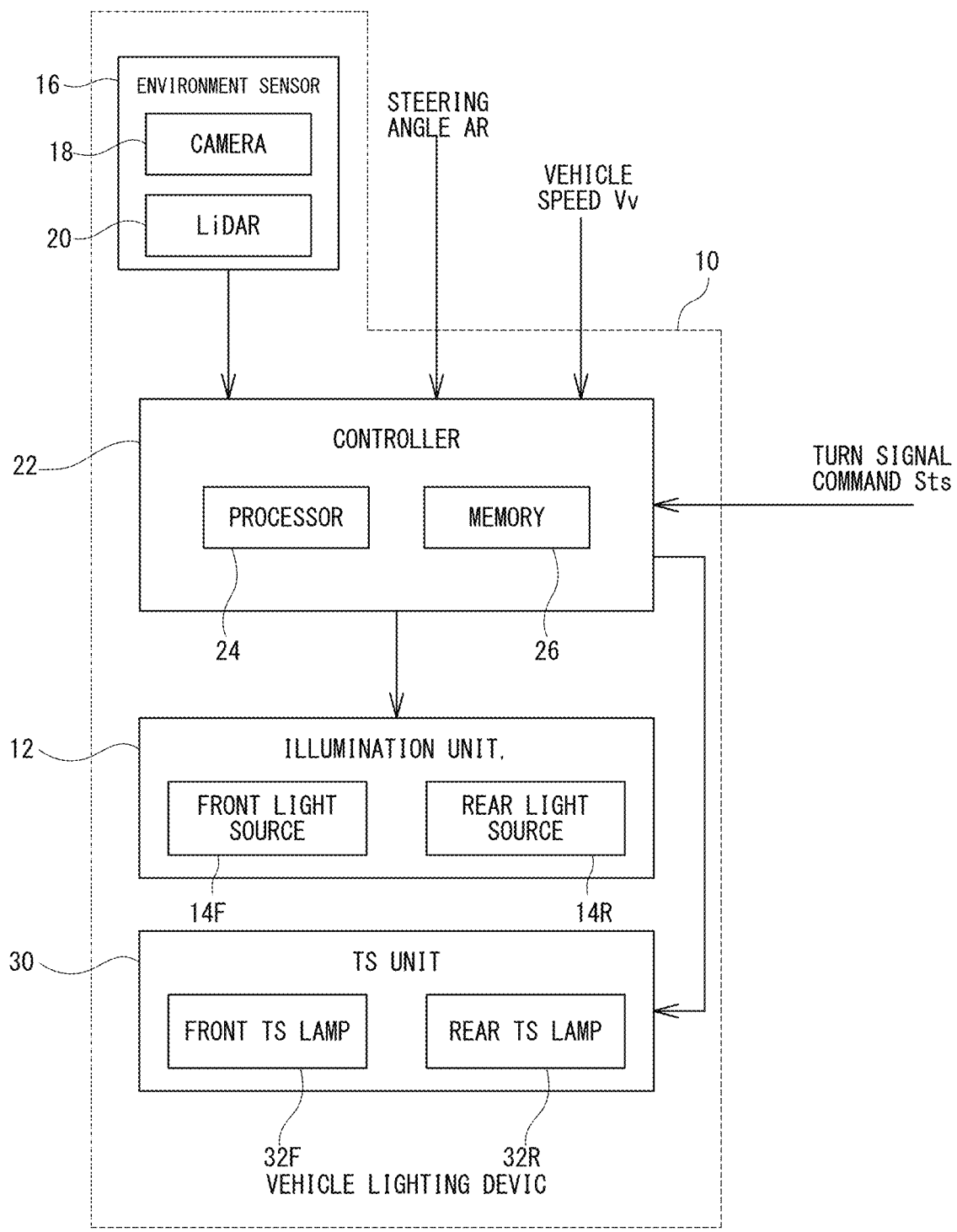
FIG. 1 is a block diagram showing a configuration of a vehicle lighting device.
Figure 2:
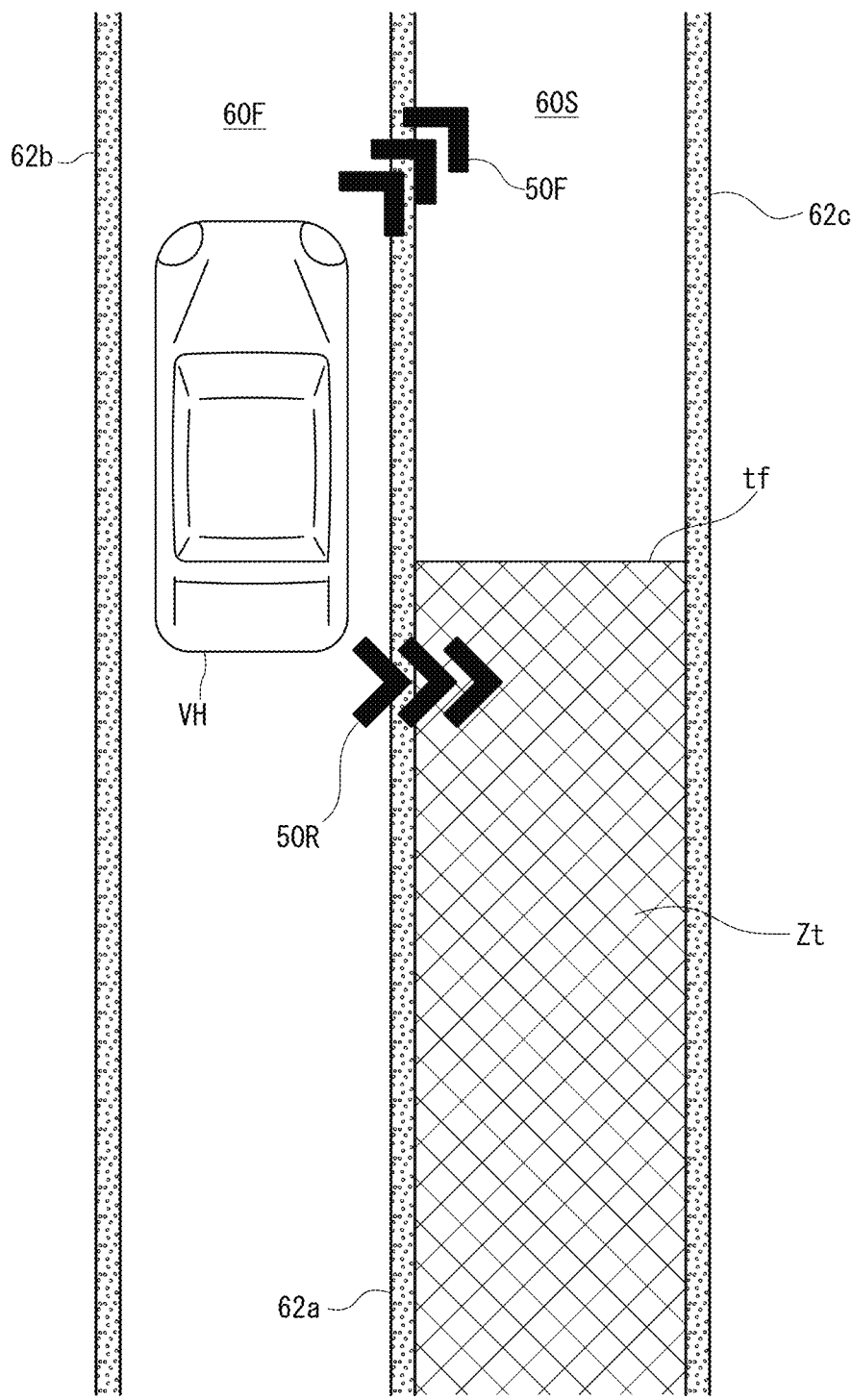
FIG. 2 is a schematic diagram showing how a lane change image is drawn on a road surface using a vehicle lighting device in a vehicle non-detection state.

Hereinafter, a vehicle lighting device 10 for a vehicle VH will be described with reference to the drawings. FIG. 1 is a block diagram showing a configuration of a vehicle lighting device 10. FIG. 2 is a schematic view showing a state in which a lane change image 50 is irradiated on a road surface using the vehicle lighting device 10. In the following description, the vehicle VH on which the vehicle lighting device 10 is mounted is referred to as a "host vehicle VH".

The vehicle lighting device 10 illuminates light around the host vehicle VH. Further, the vehicle lighting device 10 draws an image showing the behavior of the host vehicle VH on the road surface by illuminating light on the road surface around the host vehicle VH. Hereinafter, a description will be given of road surface drawing when the host vehicle VH changes a lane from the first lane 60F to the second lane 60S adjacent to the first lane 60F.

As shown in FIG. 1, the vehicle lighting device 10 includes an illumination unit 12, an environment sensor 16, a turn signal unit 30 (hereinafter referred to as a "TS unit 30"), and a controller 22. The illumination unit 12 draws an image on the road surface by illuminating pattern light on the road surface around the host vehicle VH. The illumination unit 12 includes a front light source 14F and a rear light source 14R. The front light source 14F illuminates the front-side image 50F forward or obliquely forward of the host vehicle VH. In other words, the front light source 14F illuminates the front-side image 50F at a position where the driver of the host vehicle VH can visually recognize directly. The front light source 14F may be incorporated in a headlamp unit (not shown) of the host vehicle VH. The headlamp unit is an illumination device mounted on the host vehicle VH in order to improve the visibility of the driver of the host vehicle VH and the visibility of the host vehicle VH from the outside. One headlamp unit is provided at each of the right end and the left end of the front end of the host vehicle VH. The front light source 14F may be incorporated in an adaptive high beam system unit (hereinafter referred to as "AHS"). The AHS is an illumination unit that automatically shields only a portion of a high-beam light flux which is incident on a preceding vehicle or an opposing vehicle.

The rear light source 14R illuminates the rear-side image 50R rearward or obliquely rearward of the host vehicle VH. The rear light source 14R may be incorporated in a backlamp unit (not shown) of the host vehicle VH. The backlamp unit is a lighting device mounted on the host vehicle VH in order for the host vehicle VH to recognize the presence or behavior of the host vehicle VH. The back lamp unit includes, for example, a backup lamp and a tail lamp. One backlamp unit is provided at each of the right end and the left end of the rear end of the host vehicle VH. An illumination unit having a configuration similar to that of the AHS may be incorporated in the backlamp unit, and the rear light source 14R may be incorporated in the illumination unit. The configuration of the illumination unit 12 described here is an example, and may be appropriately changed. For example, the illumination unit 12 may be a projector provided independently of the headlamp unit and the backlamp unit.

The TS unit 30 includes a front TS lamp 32F and a rear TS lamp 32R. The front TS lamp 32F is incorporated in the headlamp unit, and the rear TS lamp 32R is incorporated in the backlamp unit. When the turn signal command Sts is input, the controller 22 flashes the TS lamps 32F and 32R at a predetermined standard period. The driver operates a turn signal switch (not shown) when changing or turning the lane. In accordance with this operation, the turn signal command Sts is output.

The environment sensor 16 is a sensor that detects a state of a surrounding environment of the host vehicle VH. In order to support smooth lane change, the environment sensor 16 detects at least the presence or absence of a subsequent vehicle VF that runs rearward of the host vehicle VH and on the second lane 60S. The "second lane 60S" is a lane adjacent to the first lane 60F on which the host vehicle VH runs. Hereinafter, a range in which the environment sensor 16 senses to confirm the presence or absence of the subsequent vehicle VF is referred to as a "target zone Zt". In FIG. 2, the hatched parts by oblique lines is the target zone Zt.

The target zone Zt is not particularly limited as long as it includes a range behind the host vehicle VH. In the illustrated example, the front end tf of the target zone Zt is positioned slightly forward from the rear end of the host vehicle VH. Further, the rear end (not visible in FIG. 2) of the target zone Zt is positioned rearward by a predetermined distance from the front end tf. The predetermined distance is determined by the performance of the environment sensor 16, and is, for example, about 50 m.

The environment sensor 16 includes, for example, a camera 18 that images the periphery of the host vehicle VH, and a LiDAR 20 that detects the surrounding environment of the host vehicle VH using a laser. The environment sensor 16 may also include other sensors in addition to or instead of the camera 18 and the LiDAR 20. For example, the environment sensor 16 may include at least one of an ultrasonic sonar, an infrared sensor, and a millimeter wave radar. The environment sensor 16 may be a dedicated sensor for the vehicle lighting device 10. Further, the sensor 16 mounted for assisting the host vehicle VH in driving may be used as the environment sensor 16 of the vehicle lighting device 10.

The controller 22 is physically a computer having a processor 24 and a memory 26. The "computer" includes a microcontroller incorporating a computer system into one integrated circuit. In FIG. 1, a single processor 24 and a single memory 26 are illustrated. However, the controller 22 may include more than one processor 24 or more than one memory 26. The controller 22 may be configured by combining a plurality of physically separated computers. For example, part or all of the controller 22 may be located outside the host vehicle VH. In this case, the controller 22 communicates wirelessly with the illumination unit 12 and the environment sensor 16.

The controller 22 controls driving of the illumination unit 12 and the TS unit 30 in order to draw an image on the road surface. For example, the controller 22 determines the shape and illuminant position of the image based on detection results of various sensors and control information of the host vehicle VH.

More specifically, the controller 22 specifies a division line drawn on the road surface based on the detection result of the environment sensor 16. The division line is a line representing a boundary of a lane. The division line includes a lane boundary line 62a indicating a boundary between two lanes traveling in the same direction, a road outer side line 62b indicating a width direction end of the road, and a road center line 62c indicating a boundary between a traveling lane and an opposing lane. Hereinafter, when these lines are not distinguished from each other, they are simply referred to as a "devision line 62".

The controller 22 determines whether or not the host vehicle VH performs lane change based on the division line 62 and the control information of the host vehicle VH. The control information includes, for example, a turn signal command Sts, a vehicle speed Vv, and a steering angle AR. For example, the controller 22 determines that the host vehicle VH changes the lane when the vehicle speed Vv is equal to or greater than a certain value, the turn signal command Sts of either the left or the right is input, the direction indicated by the steering angle AR coincides with the direction indicated by the turn signal command Sts, and the second lane 60S exists in the direction indicated by the turn signal command Sts.

When the host vehicle VH changes the lane, the controller 22 flashes the TS lamp 32 in the direction indicated by the turn signal command Sts. Further, the controller 22 drives the illumination unit 12 to draw the lane change image 50 indicating the lane change on the road surface. As shown in FIG. 2, the lane change image 50 includes a front-side image 50F and a rear-side image 50R. Both the front-side image 50F and the rear-side image 50R have a shape indicating a direction of lane change of the host vehicle VH. The front-side image 50F is drawn in front of the host vehicle VH and on the road surface in the lane change direction (right direction in the illustrated example). The rear-side image 50R is drawn on the road surface behind the host vehicle VH and in the lane change direction (right direction in the illustrated example). Further, both the front-side image 50F and the rear-side image 50R flash at a predetermined cycle.

The controller 22 changes the configuration of the lane change image 50 according to the presence or absence of the subsequent vehicle VF in the target zone Zt. Hereinafter, a state in which the subsequent vehicle VF is detected in the target zone Zt is referred to as a "vehicle detection state", and a state in which the subsequent vehicle VF is not detected is referred to as a "vehicle non-detection state".

Figure 3:
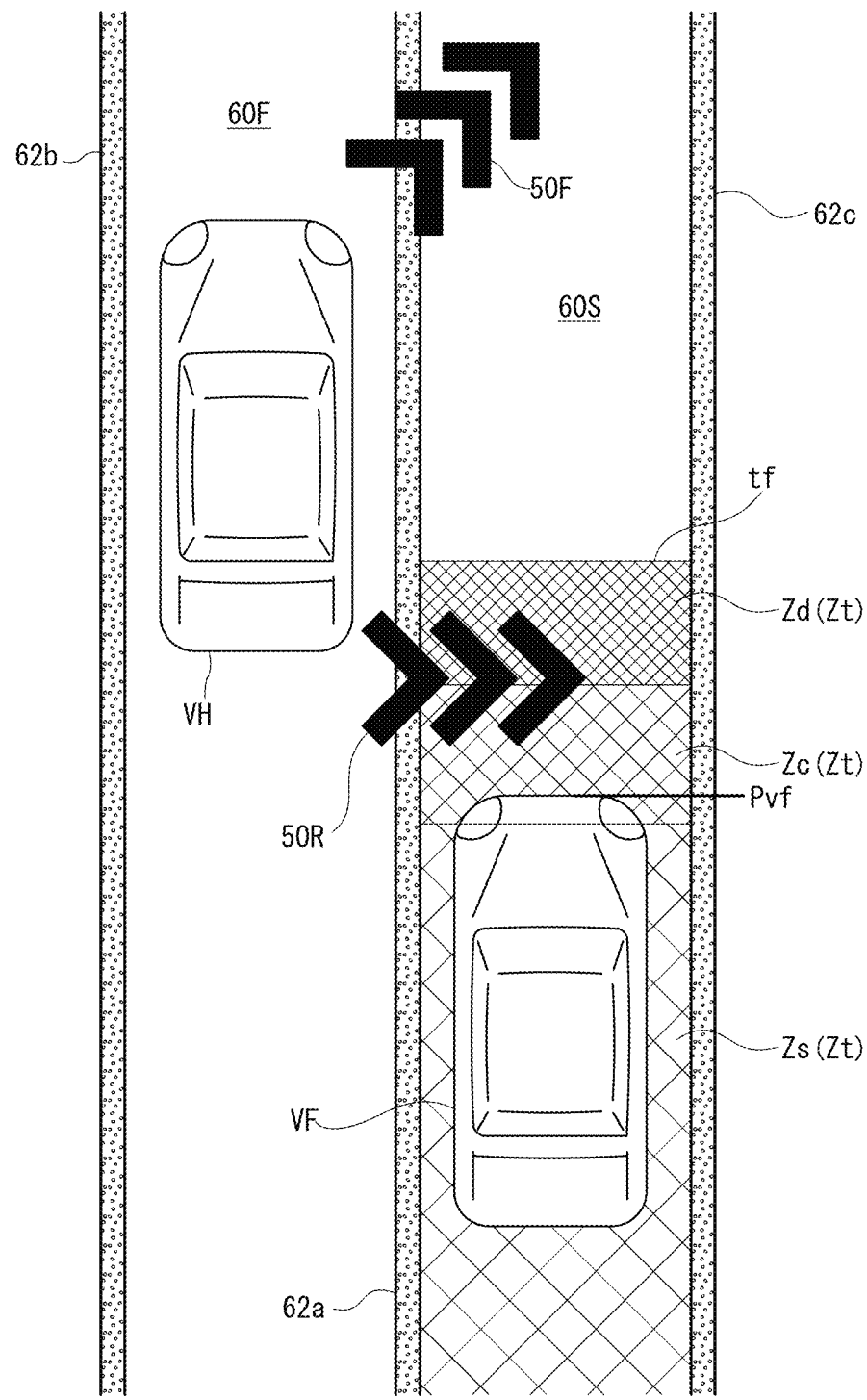
FIG. 3 is a schematic diagram showing how a lane change image is drawn on a road surface using a vehicle lighting device in a vehicle detection state.

FIG. 2 is a schematic diagram showing how a lane change image 50 is drawn on a road surface using the vehicle lighting device 10 in a vehicle non-detection state. FIG. 3 is a schematic diagram showing how the lane change image 50 is drawn on the road surface using the vehicle lighting device 10 in the vehicle detection state.

As is apparent from FIGS. 2 and 3, in the vehicle detection state (i.e., the state of FIG. 3), the controller 22 increases the size of the lane change image 50 in comparison with the vehicle non-detection state (i.e., the state of FIG. 2). In the vehicle non-detection state, the controller 22 flashes the lane change image 50 at the same cycle as the TS lamp 32. On the other hand, in the vehicle detection state, the controller 22 flashes the lane change image 50 with a shorter cycle than the TS lamp 32.

With this configuration, the lane change image 50 becomes more conspicuous in the vehicle detection state than in the vehicle non-detection state. As a result, the driver of the subsequent vehicle VF traveling on the second lane 60S tends to notice the lane change of the host vehicle VH. Accordingly, the driver of the subsequent vehicle VF considers not to obstruct the lane change of the host vehicle VH, so that the host vehicle VH can smoothly change the lane.

Further, the driver of the host vehicle VH can visually check the front-side image 50F directly. As described above, the size of the front-side image 50F and the blinking cycle change according to the presence or absence of the subsequent vehicle VF traveling on the second lane 60S. Thus, the driver of the host vehicle VH can easily recognize the presence or absence of the subsequent vehicle VF traveling on the second lane 60S. In particular, in the vehicle detection state, the cycle of blinking of the lane change image 50 is made shorter than the cycle of blinking of the TS lamps 32F and 32R. Normally, when the TS lamps 32F and 32R flash, a rhythm sound synchronized with the cycle of the flash is output in the vehicle. When the blinking cycle of the front-side image 50F deviates from the rhythm sound, the driver tends to feel discomfort. Thus, the driver of the host vehicle VH can more clearly recognize the presence of the subsequent vehicle VF. In this case, the driver of the host vehicle VH performs lane change while paying sufficient attention to the subsequent vehicle VF. As a result, the host vehicle VH can change the lane more smoothly.

In the above description, the configuration of the lane change image 50 is changed in accordance with the presence or absence of the subsequent vehicle VF in the target zone Zt. However, in addition to or instead of the presence or absence of the subsequent vehicle VF, the configuration of the lane change image 50 may be changed based on the position of the subsequent vehicle VF.

For example, as the distance between the host vehicle VH and the subsequent vehicle VF becomes closer, the controller 22 may continuously or stepwise shorten the blinking cycle of the lane change image 50 and continuously or stepwise increase the size of the lane change image 50. This will be specifically described. As shown in FIG. 3, the controller 22 may manage the target zone Zt separately into a danger zone Zd, a caution zone Zc, and a safety zone Zs. The danger zone Zd, the caution zone Zc, and the safety zone Zs are arranged in order from the front side. The risk of lane change varies depending on which zone Zd, Zc, Zs the front end of the subsequent vehicle VF is positioned. If there is a front end of the subsequent vehicle VF in the danger zone Zd, the lane change of the host vehicle VH should be conserved as much as possible. When the front end of the subsequent vehicle VF exists in the caution zone Zc, the driver of the host vehicle VH needs to sufficiently pay attention to change the lane. When the front end of the subsequent vehicle VF exists in the safety zone Zs, the host vehicle VH can safely change the lane.

FIG. 4 is a table showing a modification of the configuration of the lane change image 50. As shown in FIG. 4, it is assumed that the size of the front-side image 50F and the blinking cycle are "standard" when there is no subsequent vehicle VF. In this case, the size of the front-side image 50F is "standard" when the front end position Pvf of the subsequent vehicle VF is in the safety zone Zs, "middle" larger than "standard" when the front end position Pvf is in the caution zone Zc, and "large" larger than "middle" when the front end position Pvf is in the danger zone Zd. Similarly, the blinking cycle of the front-side image 50F is "standard" when the front end position Pvf is in the safety zone Zs, "short" which is shorter than "standard" when the front end position Pvf is in the caution zone Zc, and "short" when the front end position Pvf is in the danger zone Zd.

The change in the configuration of the rear-side image 50R is substantially the same as the change in the configuration of the front-side image 50F. However, when the front end position Pvf of the subsequent vehicle VF is in the danger zone Zd, a part of the rear-side image 50R may interfere with the subsequent vehicle VF. In this case, the driver of the surrounding vehicle including the subsequent vehicle VF cannot appropriately recognize the shape of the rear-side image 50R. Further, when the rear-side image 50R interferes with the subsequent vehicle VF, there is a possibility that the driver of the subsequent vehicle VF is uncomfortable. Therefore, when the front end position Pvf of the subsequent vehicle VF is located in the danger zone Zd, the rear-side image 50R is not drawn.

Thus, by changing the configuration of the lane change image 50 according to the distance between the host vehicle VH and the subsequent vehicle VF, the driver of the host vehicle VH can more clearly understand the position of the subsequent vehicle VF. Accordingly, the host vehicle VH can smoothly change the lane.

Further, as another form, in addition to or instead of the current position of the subsequent vehicle VF, the configuration of the lane change image 50 may be changed based on the future position of the subsequent vehicle VF. For example, consider a case where the lane change of the host vehicle VH is completed after N seconds. In this case, the controller 22 may change the blinking cycle and the size of the lane change image 50 based on the current front end position Pvf of the subsequent vehicle VF and the front end position Pvf* after N seconds of the subsequent vehicle VF. The front end position Pvf* after N seconds of the subsequent vehicle VF is estimated based on the current front end position Pvf of the subsequent vehicle VF and the relative speed of the subsequent vehicle VF with respect to the host vehicle VH. The relative speed of the subsequent vehicle VF with respect to the host vehicle VH is estimated from the temporal change of the detection result of the environment sensor 16.

FIG. 5 is a table showing another example of a change in the configuration of the lane change image 50. As shown in FIG. 5, it is assumed that the size of the front-side image 50F and the blinking cycle are "standard" when there is no subsequent vehicle VF. In the example of FIG. 5, the configuration of the lane change image 50 is changed based on the current front end position Pvf of the subsequent vehicle VF and the front end position Pvf* after N seconds.

More specifically, when the front end position Pvf* after N seconds of the subsequent vehicle VF is in the danger zone Zd, the size of the front-side image 50F becomes "large" regardless of the current front end position Pvf, and the blinking cycle becomes "short". Thereby, the driver of the host vehicle VH can clearly recognize that there is a large risk of lane change. When the front end position Pvf* after N seconds of the subsequent vehicle VF is in the danger zone Zd, the rear-side image 50R is not drawn regardless of the current front end position Pvf. This prevents the rear-side image 50R from interfering with the subsequent vehicle VF.

When the front end position Pvf* after N seconds of the subsequent vehicle VF is in the caution zone Zc, the size of the lane change image 50 is "middle" or "large", and the blinking cycle is "short". Here, when the current front end position Pvf is in the safety zone Zs and the front end position Pvf* after N seconds is in the caution zone Zc, it can be determined that the subsequent vehicle VF is accelerated and approaches the host vehicle VH. In this case, the risk of lane change is high. Therefore, in this case, the size of the lane change image 50 is "large", and the blinking cycle is "short".

When the front end position Pvf* after N seconds of the subsequent vehicle VF is in the safety zone Zs, it is predicted that the host vehicle VH can change the lane safely. Therefore, when the front end position Pvf* after N seconds is in the safety zone Zs, the size of the lane change image 50 becomes "standard" regardless of the current front end position Pvf, and the blinking cycle becomes "standard". Thus, by changing the configuration of the lane change image 50 in consideration of the front end position Pvf* of the future subsequent vehicle VF, smoother lane change is possible.

The configuration described above is an example. The vehicle lighting device 10 may be appropriately modified as long as it has the configuration described in claim 1. For example, the color and drawing position of the lane change image 50 may be changed in addition to or instead of the size and blinking cycle of the lane change image 50. The lane change image 50 may be continuously drawn without blinking. Either the front-side image 50F or the rear-side image 50R may be eliminated. The shape of the lane change image 50 is not limited to the illustrated example, and may be appropriately changed. Further, in the above description, an example of manual operation in which the driver controls acceleration/deceleration and steering of the host vehicle VH is described. However, the technology disclosed herein may be applied during the execution of advanced driving support or automatic driving in which a system mounted on a host vehicle VH automatically controls acceleration/deceleration and steering of the host vehicle VH. In this case, it is determined whether or not the vehicle system that controls acceleration/deceleration and steering of the host vehicle VH executes lane change. The controller 22 may determine the presence or absence of a lane change based on the notification from the vehicle system.

REFERENCE SIGNS LIST 10 vehicle lighting device, 12 illumination unit, 14f front light source, 14r rear light source, 16 environment sensor, 18 camera, 20 LiDAR, 22 controller, 24 processor, 26 memory, 30 turn signal unit, 50 lane change image, 50f front-side image, 50r rear-side image, 60f first lane, 60s second lane, 62a lane boundary line, 62b road outer side line, 62c road center line, VF subsequent vehicle, VH host vehicle, Zc caution zone, Zd danger zone, Zs safety zone, Zt target zone.

The invention claimed is:

1. A vehicle lighting device comprising:
    an illumination unit that draws an image on a road surface around a vehicle by illuminating the road surface with light;
    a turn signal unit that causes a turn signal lamp to flash; and
    a controller configured to control the illumination unit, wherein
    when the vehicle changes a lane from a first lane to a second lane adjacent to the first lane, the controller causes the turn signal lamp to flash on a lane change side, and causes the illumination unit to draw a lane change image for notifying surroundings of a behavior of the vehicle, and
    the controller changes a configuration of the lane change image according to at least one of a presence and a position of a subsequent vehicle traveling rearward of the vehicle and along the second lane, wherein the controller causes the lane change image to be drawn in a standard size and causes the lane change image to brink in a same cycle as the turn signal lamp when the subsequent vehicle does not exist, and causes the lane change image to be drawn in a size larger than the standard size and causes the lane change image to brink in a cycle shorter than the turn signal lamp when the subsequent vehicle exists.

2. The vehicle lighting device according to claim 1, wherein the controller stepwise shortens the cycle of blinking of the lane change image and stepwise increases the size of the lane change image as the distance between the vehicle and the subsequent vehicle becomes closer.

3. A vehicle lighting device comprising:

an illumination unit that draws an image on a road surface around a vehicle by illuminating the road surface with light;

a turn signal unit that causes a turn signal lamp to flash; and a controller configured to control the illumination unit, wherein when the vehicle changes a lane from a first lane to a second lane adjacent to the first lane, the controller causes the turn signal lamp to flash on a lane change side, and causes the illumination unit to draw a lane change image for notifying surroundings of a behavior of the vehicle, and the controller changes a configuration of the lane change image according to at least one of a presence and a position of a subsequent vehicle traveling rearward of the vehicle and along the second lane, wherein the controller estimates a position of the subsequent vehicle at the time of completion of the lane change, and stepwise shortens a cycle of blinking of the lane change image and stepwise increases a size of the lane change image as a distance between the vehicle and the estimated position becomes closer.

4. A vehicle lighting device comprising:

an illumination unit that draws an image on a road surface around a vehicle by illuminating the road surface with light;

a turn signal unit that causes a turn signal lamp to flash; and a controller configured to control the illumination unit, wherein when the vehicle changes a lane from a first lane to a second lane adjacent to the first lane, the controller causes the turn signal lamp to flash on a lane change side, and causes the illumination unit to draw a lane change image for notifying surroundings of a behavior of the vehicle, and the controller changes a configuration of the lane change image according to at least one of a presence and a position of a subsequent vehicle traveling rearward of the vehicle and along the second lane, wherein the lane change image includes a front-side image illuminated at a position where a driver of the vehicle can visually recognize directly, and a rear-side image illuminated at a side of a rear portion of the vehicle, and when the subsequent vehicle is positioned in an illumination area of the rear-side image, the controller stops the drawing of the rear-side image while causing the front-side image to be drawn in a configuration different from the configuration in which the subsequent vehicle is not positioned in the illumination area of the rear-side image.

* * * * *